Figure 1:
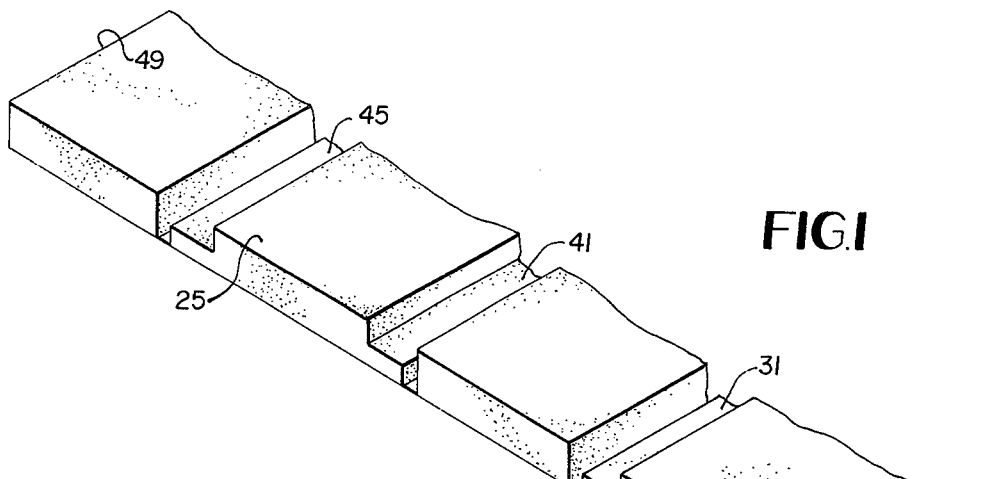

United States Patent [19]

McClay, Jr.

[11] 4,007,543

[45] * Feb. 15, 1977

[54] MULTIPLE GAUGING DEVICE FOR MODIFIED SHIP-LAP CORNER SEAMS

[76] Inventor: Alexander W. McClay, Jr., 29 W. Bank St., Petersburg, Va. 23803

[ * ] Notice: The portion of the term of this patent subsequent to July 23, 1991, has been disclaimed.

[22] Filed: Nov. 12, 1975

[21] Appl. No.: 631,037

Related U.S. Application Data

[63] Continuation of Ser. No. 486,654, July 2, 1974, abandoned, which is a continuation of Ser. No. 178,696, Sept. 8, 1971, abandoned.

[52] U.S. Cl. .............................................. 33/137 R
[51] Int. Cl.² ......................................... G01B 3/10
[58] Field of Search ............ 33/137 R, 138, 107 R, 33/174 B, 174 G, 161, 197, 112, 103

[56] References Cited

UNITED STATES PATENTS 1,732,906  10/1929  Morton .................................. 33/42
3,296,702  1/1967   Feddish ............................... 33/103
3,406,456  10/1968  Schleich .......................... 33/107 R

*Primary Examiner*—Steven L. Stephan

[57] ABSTRACT

For use in laying out duct or box-like structures, a gauging device having multiple sides, including appendages in predetermined positions, with rotatable connection means for attaching the gauge to a measuring tape (or it can be integral with a measuring bar), with the appendages serving to position the tape or bar so as to add various predetermined lengths to the tape or bar equivalent to material lapped or cut away in the fabrication of corner and lap joints or seams with the measuring tape or bar indicating directly in terms of the specified or finished inside dimensions of the structure. The appendages are configurated to enable measuring from points on each of several variously oriented planes.

13 Claims, 15 Drawing Figures

INVENTOR
ALEXANDER W. McCLAY, JR.

BY Wilfred G. Caldwell

ATTORNEY

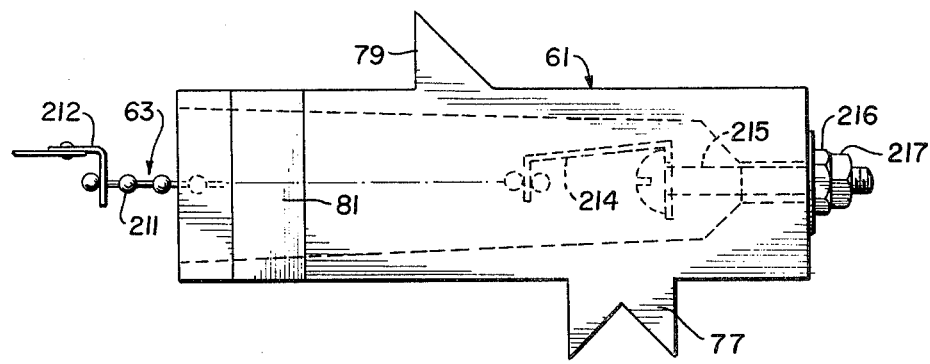
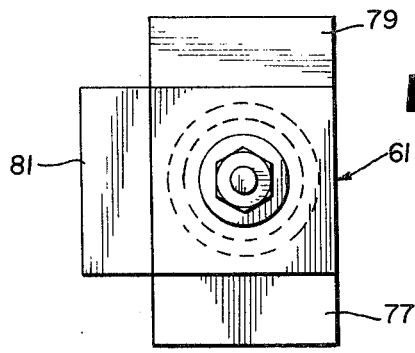
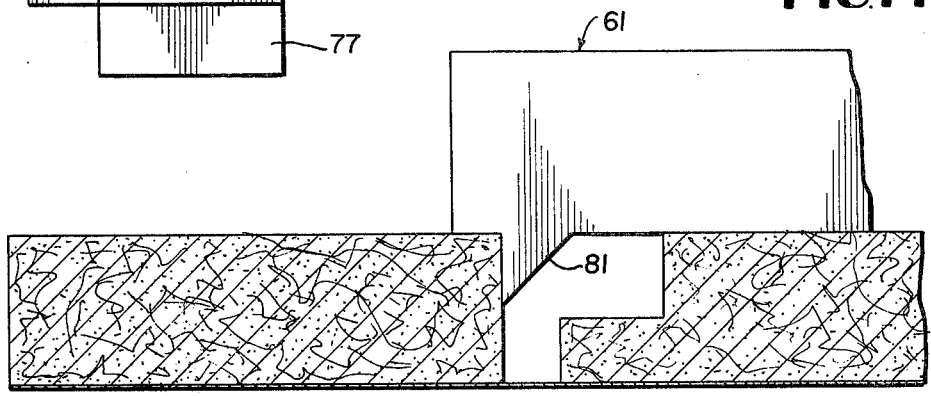
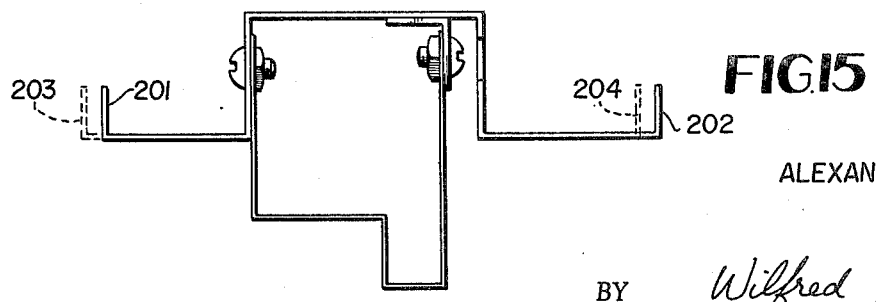

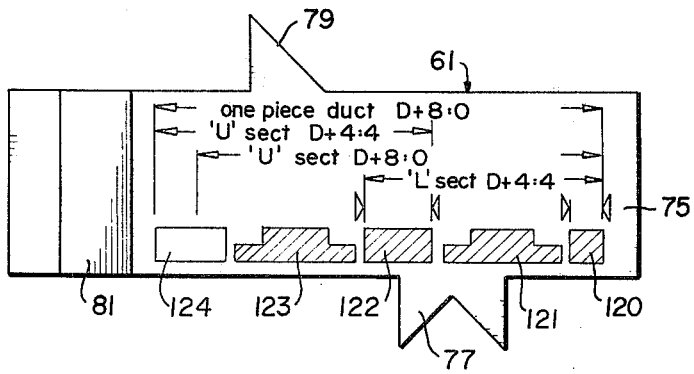
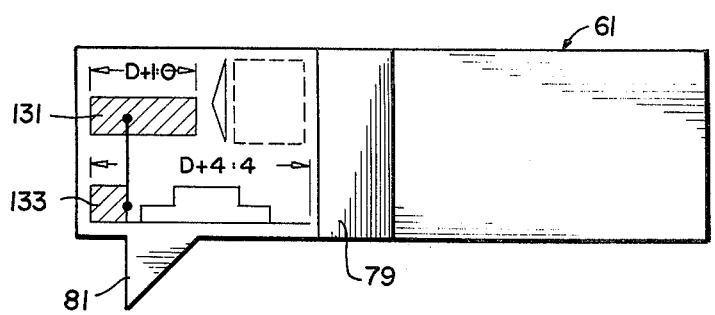
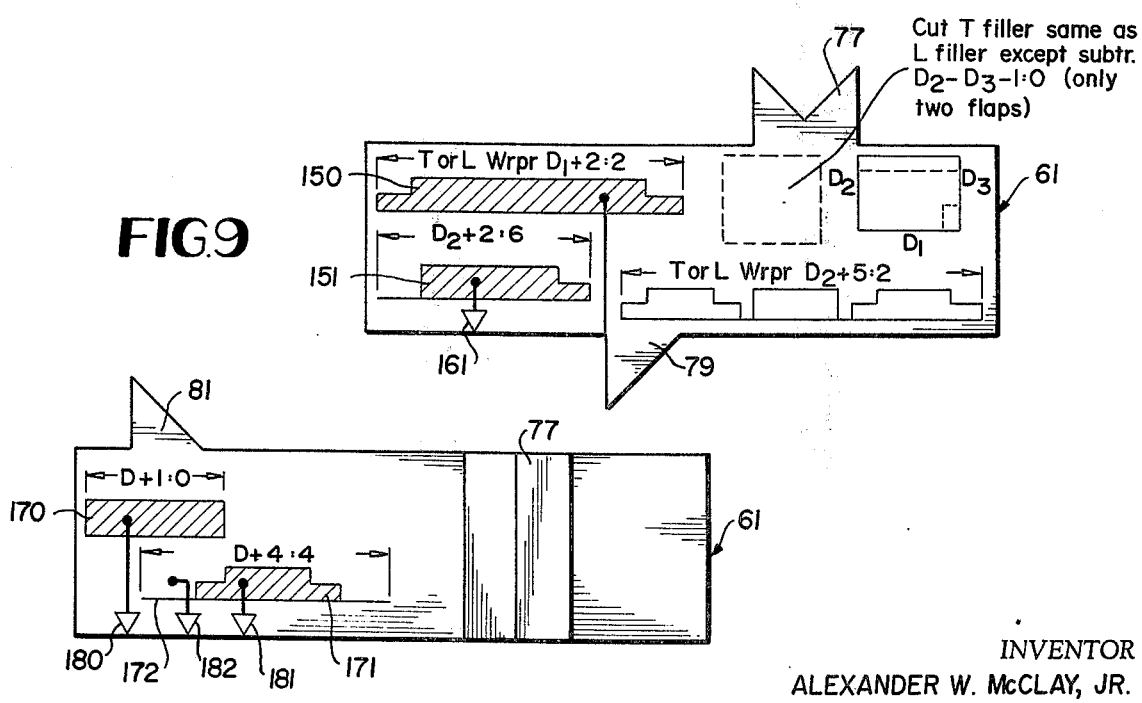

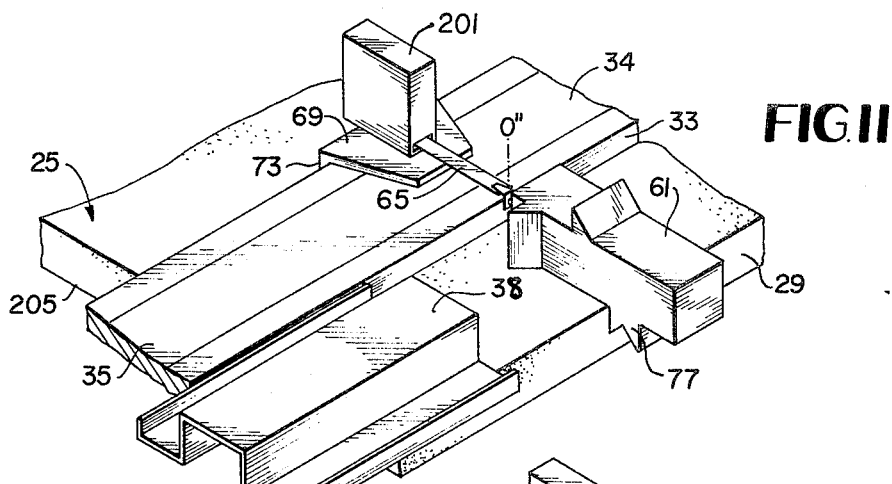
FIG.11
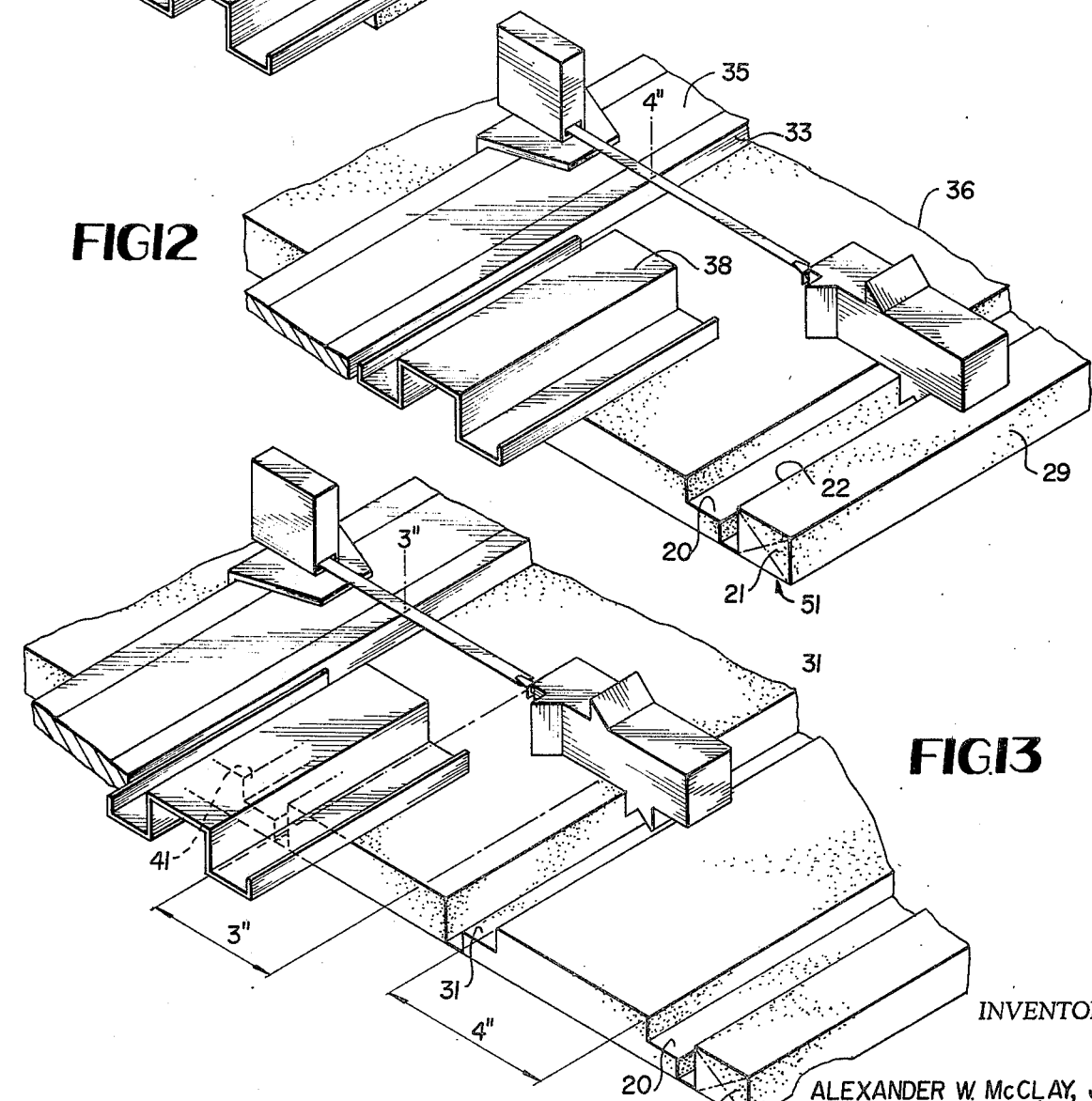
FIG.12
FIG.13
INVENTOR
ALEXANDER W. McCLAY, JR.
BY Wilfred G. Caldwell
ATTORNEY

MULTIPLE GAUGING DEVICE FOR MODIFIED SHIP-LAP CORNER SEAMS

This is a continuation of application Ser. No. 486,654, filed July 2, 1974, now abandoned, which is a continuation of application Ser. No. 178,696, filed Sept. 8, 1971, now abandoned.

The present invention relates to an invention of the category of various embodiments disclosed in copending application Ser. No. 53,951; filed July 10, 1970; by the same inventor.

The present invention relates to gauging devices essentially a short, multi-sided bar carrying appendages, locating marks, and certain diagrammatical data along its sides which may be used in rotatable (around its longitudinal axis) attachment with a measuring tape, or rigidly attached to a measuring bar.

The gauging device has the capacity to add several dimensions to the length of the tape, or bar, when measuring horizontally or linearly from, e.g. a mark or point on a horizontal surface, from a dependent vertical face, or from a trough formed by a plurality of declining vertical faces.

The several dimensions are those allowances made in the layout and subsequent cutting of flat stock, of appreciable thickness, for the fabrication of air ducts, conduits of rectangular cross-section, boxes or box-like structures when the sides of the structures are joined by means of rabbet, butt, and ship-lap type joints, the device adding certain predetermined lengths to the measuring tape, or bar, to compensate for the material lapped or cut away and also for the cutter-to-guide-edge width of the cutting tool, in order that the measuring tape, or bar, may directly indicate the guide-edge position for each subsequent cut in terms of the finished, or specified, inside dimensions of the structure.

The invention finds wide-spread use in the layout and cutting of fiber glass duct board manufactured for the fabrication of ducts for air conditioning systems. The material is usually an insulating board, faced on one side with a thin aluminum sheet which serves as a structural band to hold the sides of the duct together, and also as a vapor barrier. The board is customarily manufactured in three thicknesses, one, one and one-half, and two inches. The thicker materials, or course, require greater seam allowances, and three different size layout devices are required when working with the three thicknesses, each similar except in length, size and longitudinal placement of the appendages, longitudinal placement of the locating marks, and the numerical data on the sides thereof, but the operating principle being the same.

In a typical example the corner joints of a section of duct are cut across the board, parallel to the short side (normally four feet), and if the length (normally ten feet) of the board is sufficient, the joints for the four corners are cut. The two end cuts are then fastened to form the finished section, the duct having been made, in this instance from one continuous piece, in the following manner:

The board is placed on a work table with the aluminum facing next to the table. The first cut is made by a special tool, designed to cut a groove formed by a butt edge, i.e. a dependent vertical face, on one side thereof, and on the other side, a rabbeted edge, or, two dependent vertical faces, one offset from the other in such manner that when the board on one side of such a groove is swung upward into a vertical position, the first mentioned vertical face may lie in a horizontal position with its butt edge and portion of adjacent edge coinciding with the subsequently mentioned two dependent vertical faces. A corner joint so formed will hereinafter be called a modified ship-lap joint, a groove so formed will hereinafter be called a groove, the tool used to cut the groove will hereinafter be called a grooving tool, either side of the grooving tool which bears against the side of a straight-edge, used to guide the tool in a straight line, will hereinafter be called the tool edge, and the straight-edge used as the guide will hereinafter be called the guide-edge.

Then proceeding from right to left along the board being grooved, the next three cuts are made in like manner except that the two tool edges are used alternately against the guide-edge, in order that the two sides of the groove (the rabbeted edge side and the butt edge side) will be located alternately to the right and left of each other with each succeeding cut. The next cut is made by a knife, vertically through the board including the aluminum facing. In the above described series of corner joint cuts, it is assumed that the first cut was made so that the butt edge side of the groove is on the right hand side of the groove and located approximately an inch (in the example of one-inch thick board) to the left of the right hand edge of the board. The fiber glass, left along the right hand edge of the board is now cut away from the aluminum facing to leave a tab. At this point, all that is necessary to form the duct is to bring the first side up to a vertical position, the same for the third side, the fourth side is swung up and over to mate its butt edge into the rabbeted edge of the first side, bend the tab over the corner thus formed, staple it down (to the outside face of the fourth side) and seal the edge of the tab with a special tape.

However, before the board is folded to form a duct, a rabbeting tool is moved along one of the edges normal to the corner seam cuts, cutting a rabbet out of the top surface of the board; a second rabbeting tool is moved along the opposite edge of the board to cut a rabbet in the bottom surface of the board, just above, and adjacent to the aluminum facing. These latter cuts form the male and female edges of ship-lap joints used to join one section of duct to another.

In order to fabricate ducts of large cross-sectional area, and also, in order to reduce waste, it becomes necessary, rather than making the duct from one continuous piece of board, as described above, to make the duct from four separate pieces, or of two "L" sections, or by means of a "U" section and a cap piece.

Air conditioning duct sizes are always given, or specified in terms of the inside width and depth dimensions which if not otherwise qualified, shall be, herein, construed to mean only the width of a side, top, or bottom panel of a section of duct, or of a duct fitting (or the width of a cutting tool measured in this same direction and in this instance, insignificant width defines, e.g. the thickness of a knife blade, whereas significant width means the width of the material lapped or removed in forming a joint, or more). With this in mind, and in view of the fact that all but one of the above joint cuts affect the inside dimensions, and also mindful that continuous corner joints are formed by a groove cut and that non-continuous corner joints are made up of a rabbeted edge, a mating butt edge, and a stapling tab, and again mindful that, thus far in the interest of simplicity of description, nothing has been mentioned regarding the layout of elbow and too fittings; it becomes quite apparent that the dimensional allowances that must be made, to compensate for the material lapped, or cut away, etc., are many and varied.

In addition to the above, it must also be determined whether the remaining board, or potential scrap, is large enough for the fabrication of ducts, to desired sizes, by means of joining two "L" sections, or by joining a "U" section with a cap piece, or by joining four separate pieces, or ideally, in one piece, as outlined above, the required length of board being, of course, the total of the pertinent side dimensions plus the total of the pertinent seam allowances.

Currently, there are two methods of coping with the above, as set forth by the manufacturers of duct board; briefly as follows; the first is called the "guide edge method", in which the seam allowances pertaining to the first side are added to the given side dimension, and from this is subtracted the center-to-guide-edge width of the grooving tool, to give a sub-total; to this sub-total is added the seam allowances and the given dimension of the next side, to give the next sub-total, etc., continuing for the rest of the sides. Then, beginning at the lower left hand corner of the board for each measurement, each of the above sub-totaled dimensions is marked along the lower edge and the same dimensioning is repeated, beginning at the upper left hand corner. These hand constructed marks locate the position of the straight edge against which the cutting tool is guided. The reason for beginning at the left hand of the board, and for the one subtraction, is that this places the guide edge on the left hand side of the subsequent cut, allowing the cutting to be done with the right hand and also it assures that the guide edge will be on the board in the event that the board is no longer than that necessary from which to cut the section. Those many calculations require addition and substraction of fractions with attendant errors and heavy loss or scrap of duct board.

According to one of the board manufacturer's fabrication manuals, contractors using the board evidently thought this method unnecessarily complicated, and developed the "center-line" method, which is the same as the foregoing, except that the guide edge is omitted. This does away with the above substraction and also allows the dimensioning to begin at the left, or the right hand edge. The dimensions are marked along both the upper and lower edges of the board, as in the foregoing. Then, using a straight edge, lines are drawn, across the board, between the corresponding dimension marks; these are the center-lines of the subsequent cuts. The center of the grooving tool is marked on top of the leading edge, and the cuts are then made free-hand, lining up the mark on the tool with the line on the board. (There are two problems here: one is that, due to the abrasive nature of the material, the workman spends an appreciable amount of time sharpening pencils; the other is that the mark on the grooving tool being about an inch above the line on the board, if the workman's line of vision is not exactly normal to the board the cut is not accurately made, and this, when the board is folded to become a section of duct, causes the corners of the duct to be "out of square", which, of course, causes difficulty when joining one section of duct to another, and particularly when the adjacent section is out of square in the opposite direction.)

The invention herein described, reduces all of the above to a very simple, straight-forward, and accurate procedure, even for the inexperienced.

The gauge is attached to a measuring tape in one embodiment, as mentioned earlier. This tape is merely a spring return type with capacity to measure six to eight feet. The housing of the tape is mounted in such a way that it may be removably carried on the blade (straight-edge portion) of a T-square.

In using the present invention, the board is placed on the cutting table with its aluminum facing against the table. The blade of the T-square is placed across the duct board (in the direction in which the corner seams are to be cut), and with its head bearing against the long side of the table adjacent to the worker. It is now only necessary to properly position the gauge at the right hand edge, or at the immediately preceding cut to the right of the T-square, as the case may be, move the T-square to the left until the right hand edge of the blade coincides with the measurement (i.e. the desired inside dimension of that side of the duct) as indicated on the tape, and the blade is in the correct position to provide the guide edge for the subsequent cut.

On each side of the gauge are shown certain diagrammatical data which generally depicts the sides of duct in stretchout cross-section. The portions of these sections containing diagonal lines, circular marks with lines extending therethrough to appendages, or to locating marks, represent the sides having those particular combinations of corner joints for which the correct lengths are added, to that shown by the tape, by positioning the indicated appendage, or locating mark, at the immediately preceding groove cut, or knife cut, or butt edge, as the case may be. This will be explained in greater detail in reference to the drawings.

Also, in the diagrammatical data, in addition to the above cross-sections containing the diagonal lines, which are used as above indicated, there are cross-sections which are shown in outline only. These are included only for information as to the length of board, in addition to the dimension, or sum of the dimensions, respectively, of the side, or combination of sides, required to cut said side, or combination of sides including the related combinations of corner seams. This will also be further explained in connection with the description of the drawings.

With the foregoing in mind, it is among the objects of this invention to provide apparatus for gauging purposes wherein, in connection with a linear measuring arrangement, the present invention directly adds any of several predetermined dimensions to the scale of the linear measurer when measuring from points on each of several variously oriented planes.

Another object of the present invention is the provision of a measuring gauge, per se, which has a body and appendages related thereto in predetermined fashion.

It is another object of the invention to incorporate such a gauge with a marked bar or linear extendable measuring device.

Yet another object of the invention is the provision of apparatus incorporating the use of the invention in conjunction with a T-square or straight edge for laying out duct and duct fittings to desired inside dimensions.

Finally, a still further object, is the provision of a gauging device using the described principle which device is simple, straight forward, accurate, and readily useable by the inexperienced.

Figure 2:
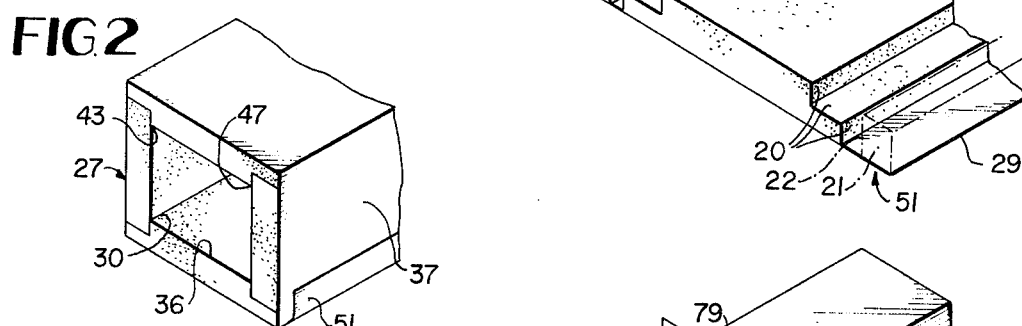
Figure 3:
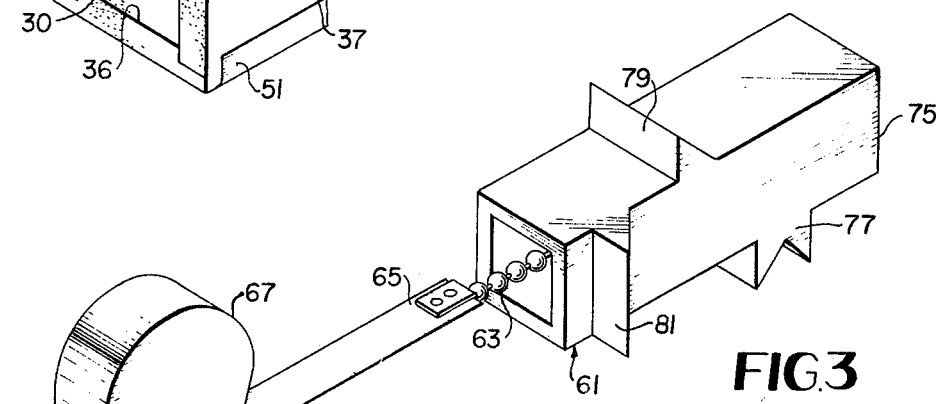
Figure 4:
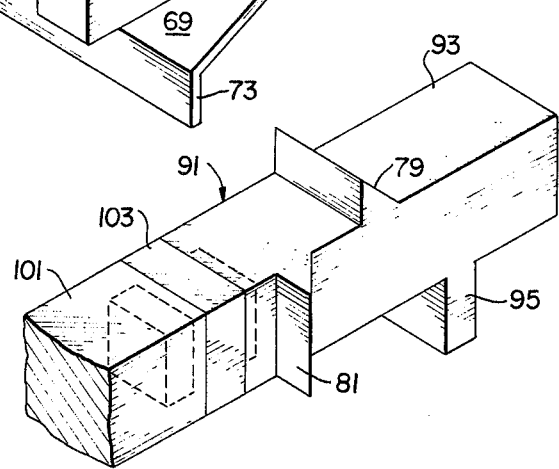

The invention will be better understood from a reading of the following detailed description thereof, when taken in the light of the accompanying drawings wherein:

FIG. 1 is a view in perspective showing a typical stretchout of a board to be fabricated into duct, FIG. 2 is a view in perspective of the duct fabricated from the board of FIG. 1, FIG. 3 shows in perspective a gauge of the present invention in connection with a reelable linear measuring device, FIG. 4 is a view in perspective of a modification of the gauge of FIG. 3, depicted in association with a linear bar measuring device, FIG. 5 is a view in side elevation with dotted interior construction of the gauge of the first embodiment, FIG. 6 is an end view of the structure of FIG. 5, FIG. 7 is a view in side elevation of the gauge of FIG. 5 showing a first side thereof, FIG. 8 shows the second side of the same gauge, FIG. 9 shows a third side of the gauge of FIG. 5, FIG. 10 shows a fourth side of the gauge of FIG. 5, FIG. 11 is a view in perspective showing the gauge of FIGS. 3 and 5 in operative relation to a duct board, for a first groove cut, FIG. 12 shows the structure of FIG. 11 positioned in the former groove cut and measuring for a second groove cut, FIG. 13 shows the above structure advanced along the board for the next cut, FIG. 14 shows the gauge positioned for the last, or knife cut, and FIG. 15 is an end view showing the groove cutter tool in solid outline and a modification thereof in dotted outline, relocating the tool edges for use with the structure of FIG. 4.

Referring to FIG. 1, there is illustrated a typical material 25 from which it is desired to fabricate, for example, the structure 27, shown in FIG. 2. For purposes of the present description, it will be assumed that the material 25 is a fiber glass duct board and it is desired to use this board to fabricate the duct 27 of FIG. 2, knowing the inside dimensions of the duct. It is, of course, necessary to cut the several grooves in the correct positions in order that the board 25 can be folded and secured in the configuration of the duct 27 while maintaining a high degree of accuracy to the predetermined dimensions. Measurements progress from the right hand edge 29 of board 25 toward the left, forming cuts and grooves in sequence. The first cut will form the rabbeted edge 20 by simultaneously cutting two vertical and one horizontal surface with the cutter positioned so that board section 21 is left over the face which becomes flap 51.

The next cut, or the second groove cut, is that necessary to form groove 31 which enables bonding of the board to define corner 30 of duct 27. Thus, a distance is laid out from edge 22 to the nearest edge of groove 31 being formed, which positioned guide edge 33 of the T-square 35 so that the cutter of the grooving tool 38 (see FIG. 12), guided against the edge of the T-square, will form the groove in proper relation to the edge 22 so that the side 36 (FIG. 2) so cut will be of the correct dimension when the duct is assembled. Then, in succession, cut 41 (FIG. 1) is made to form corner 43 in similar fashion, cut 45 is made similarly to form corner 47, next, a knife cut is made, vertically through the fiber glass, and the aluminum foil, to form a butt edge 49, and finally a last cut is made to remove the fiber glass 21 from tab 51 (see FIG. 2) which will overlap side 37 when the duct is formed.

In FIG. 3, a first embodiment of gauge 61 is shown with rotatable connection means 63 linking the same to a tape 65 reelable into and out of housing 67. Housing 67 is in turn fixed to a base 60 comprising a horizontal reach 71 and a vertical reach, depending flange 73.

In general, it will be noted that the gauge 61 includes a body 75 and appendages 77, 79, and 81 extending outwardly therefrom at predetermined locations. The use of this device will further be explained in connection with the detailed showings of figures later to be described.

In FIG. 4, there is shown in perspective, a second embodiment of the invention which comprises a modified gauge 91 having a body 93 and a differently shaped and located appendage 95. This gauge is connected to a linear measuring device comprising bar 101 by any suitable means, as for example, the plastic tenon plug 103 extending between the hollow interiors of body 93 and bar 101.

It should be noted at this point that gauges 61 and 91 are interchangeable relative to linear measuring devices, and either may be used with any type of linear measuring device available, including even, e.g. yard sticks or strings.

FIGS. 7-10 show the respective sides of the gauge 61 of FIGS. 5 and 6 without attachments for receiving a linear measurer.

In FIG. 7, a first side view, there is shown the appendage 77 in the lower or working position on the body 75 of the gauge 61 and immediately above appendage 77, but on body 75, are shown four diagonally lined, cross-sectional diagrams 120, 121, 122 and 123, to form, from right to left, a stapling flap, and three sides of a duct which is to be cut in a four side continuous string. In cutting the section symbolized at 120, later to become the stapling flap, the leading vertical face of the appendage 77 is hooked over the right hand edge 29 of the board 25 (see FIG. 11), corresponding to the right hand edge of the section depicted in the diagram 120 (FIG. 7). The blade 34 (FIG. 11) of a T-square 35 carrying the tape 65 to which the gauge 61 is attached, is pulled to the left until the "O" inch point on the tape coincides with the guide edge 33 which is now in position for the first groove cut. The cut is made in a manner so that the butt edge face of the groove will be on the right hand side and the rabbeted edge side on the left. It is well to recall, at this point, that in the foregoing it was stated that to correctly position the guide-edge for a subsequent cut, it is necessary only to properly position the gauge at the immediately preceding cut, or edge, move the blade of the T-square, carrying the tape, to the left until the inside dimension of that side of the duct as indicated on the tape, coincides with the guide-edge. As the above first groove cut is spaced from the beginning edge a distance necessary to later become a stapling flap, and this, of course, being no part of an inside dimension of the duct, the guide-edge was set at the "O" inch point on the tape. In cutting the side 121 (see FIGS. 7 and 12), the trailing vertical face of appendage 77 is placed against the left hand vertical face of the section 120 (21 in FIG. 12), and the T-square, carrying the measuring tape, moved to the left until the desired inside dimension of that side of the duct, as indicated by the tape, coincides with the guide-edge, thus positioning the guide-edge for the second groove cut. This groove is cut with the leading end of the grooving tool reversed as compared with its position in making the prior groove cut, so that the side 121 will have a rabbeted edge along each of its edges.

In cutting the side 122, the leading edge of the appendage 77 is hooked over the butt edge face formed by the immediately prior groove cut, the T-square, carrying the measuring tape, moved to the left until the desired inside dimension of that side of the duct, as indicated by the tape, coincides with the guide-edge, thus positioning the guide-edge for the third groove cut. This groove is cut with the leading end of the grooving tool reversed as compared with its position in making the prior groove cut, so that the side 122 has a butt edge along each of its edges.

The fourth side of the duct stretch-out depicted here is shown in outline only, indicating that the guide-edge is not set by the appendage 77; but is shown here for another purpose. It will be recalled that in the foregoing it was mentioned that in order to make use of the duct board, leaving the least possible scrap, ducts are fabricated, not only in a four-piece continuous string, as shown here, but also by means of two "L" sections, a "U" section with a cap piece, or, by means of four separate pieces joined to form the duct. Above the sectional diagram (FIG. 7) are four sets of dimensional arrows, and between each set of arrows there is certain informational and numerical data, as follows: the first: one piece duct: D+8:0 this will indicate to the worker that the total material required to cut the four sides of the duct in one continuous string will be D, the sum of the inside dimensions of the duct, plus eight inches. The second of the two numerals shown in these diagrams indicates eighths of an inch. The first "U" section: D+4:4 indicates that a "U" section terminating with butt edges, will require D, the sum of the inside dimensions of the "U" section plus four and four-eighths inches. The second "U" section: D+8:0 indicates that a "U" section terminating with rabbeted edges with stapling flaps will require D, the sum of the inside dimensions of the "U" section, plus eight inches. The fourth, and last; "L" section D+4:4 indicates that this combination of sides will require D, the sum of the inside dimensions of the sides, plus four and four-eighths inches.

FIG. 8, a second side view, shows appendage 81 in the lower, or working, position. On the body of the guage, and immediately above appendage 81 are two diagonally lined cross-sectional diagrams 131 and 133. The section 131 represents one of two like sides used when making a section of duct from four separate side pieces, or the last side out of the one piece duct as shown in FIG. 7, reference 124, or a part of duct fitting. The section 133 is the material above a strip of aluminum facing which is to be later removed to leave a stapling flap along a left hand edge. Both of these sections are laid out and cut by hooking the leading face of the appendage 81 over the right hand butt edge of the section, moving the T-square, carrying the measuring tape, to the left until, in the case of section 131, the inside dimension of that side of the duct, or duct fitting, as indicated on the tape, coincides with the guide edge; and in the case of the section 133, which is cut in order to leave a stapling flap, the T-square is moved to the left to the "Q" inch point, the cuts, in each case, being made by a knife, vertically through the board including the aluminum facing.

Above the section 131 are two dimension arrows between which is the numerical data: D+1:0, indicating that the total material required to cut the section will be D, the inside duct dimension of the side, plus one inch. Shown to the right of the section 133 is a section shown in outline only, and to the right of this, a stapling flap. Above the section, with its two stapling flaps, are dimensional arrows with the numerical data: D+4:4, indicating that total material required to cut this combination will be the inside duct dimension D, of this side of the duct, or the duct fittings, plus four and four eighth inches.

FIG. 9, a third side view, shows the appendage 79 in the lower, or working position. Shown above this appendage is a section 150 with a line drawn therefrom to the leading edge of the appendage. This is a section through, and lying parallel to the corner seam cut direction, of the three sides string shown in the lower right corner of FIG. 9, and is laid off similarly to the foregoing and out vertically through the board and the facing with a knife and the edges later rabbeted. Above the diagram of the section is the informational and numerical data: T or L wrpr. $D_1$+2:2, indicating that the section is one through a toe or an elbow wrapper piece and that the material required, in the direction of the dimension, is the inside dimension of the duct at $D_1$, see upper right corner FIG. 9, plus two and one quarter inches.

The section 151 is through a piece used as a filler piece when making a toe or an elbow fitting, and is laid off by placing the arrow 161 adjacent to the right-hand, or beginning, edge of the board, moving the T-square, carrying the measuring tape, to the left until the inside dimension of the duct entering the fitting at $D_2$ (see diagram at upper right corner) as indicated on the tape coincides with the guide-edge of the T-square, and at this point, the cut is made, with a knife, vertically through the fiber glass portion of the board but not through the aluminum facing.

FIG. 10, a fourth side view, shows no appendage located along the lower surface in order that the gauge, when in this position, may be used to position the guide-edge from a mark made by a knife cut. The section 170, also shown in FIG. 8, is shown hereon as a matching pair of the sections 170, together with a matching pair of the sections 171, to form the sides of a section of duct made up of four separate pieces. In cutting the section 171, together with its adjoining stapling flaps, the locating arrow 182 is positioned directly over the right hand, or beginning edge, of the board, the T-square, carrying the measuring tape is moved to the left until the guide-edge coincides with the "O" inch point on the tape, at this point a knife cut is made vertically through the board to, but not through the aluminum facing. The locating arrow 181 is now placed over the mark made by the knife cut, the T-square moved to the left until the inside dimension of the duct, to be formed by this side, as indicated on the tape, coincides with the guide-edge, and a second knife cut is made, through the fiber glass but not through the aluminum facing. The locating arrow 182 is again used, being located over the latter knife mark, the guide-edge moved to the left to the "O" inch point on the measuring tape, and, at this position of the guide-edge, a third knife cut is made, vertically through the board and including the facing. Next, with the blade of the knife held in a horizontal position, cuts are made along both edges, just above the aluminum facing, to separate the fiber glass from the facing in order to leave the two stapling flaps; next, a rabbeting tool is moved along the edges of the remaining board, thus finishing the side.

Upon examination of the four sides, it can be seen that the section 171, together with its two stapling flaps, could have been laid off by the gauge, setting the guide-edge for the first two groove cuts by using the appendage 77, see FIG. 7, and setting the guide-edge for the left hand stapling flap by using the appendage 81, see FIG. 8, and, or course, removing the surplus fiber glass material from the stapling flaps thus cut. It becomes obvious, therefore, that the gauge might be made having three sides, a triangular section, which would have certain indexing advantages; however, due to the difficulty in moving the ship-lap grooving tool through the fiber glass, and particularly the more dense materials, it is felt that allowing the worker the additional alternatives more than offsets the above.

The gauge, as above described, without modification, is applicable in the lay-out of duct fittings, such as toes, elbows, and transitions (a transition is a more or less straight through fitting which changes during the course of its length, from a rectangular section of given dimensions to that of different dimensions, or to a like, or unlike, section located on a different longitudinal center-line) when these are fabricated by means of joining four separate pieces, in a manner similar to that in which sheet-metal craftsmen make similar fittings from steel sheets. However, one of the manufacturers of fiber glass duct board has developed a method for fabricating toes and elbows which is much more direct and less time consuming, and incidentally, one for which the board is ideally suited, in that an elbow is made up of only two pieces, and a toe, in never more than two pieces, and under certain circumstances, it may be made in only one piece. In the interest of simplicity, explanation of certain diagramatical, informational, and numerical data pertinent to the foregoing, as shown on the sides in FIGS. 8 and 9, has not been treated in detail because it is believed that the principles explained will enable one skilled in the art to understand all operations achievable through the use of the gauges.

FIG. 11 shows the gauge in operation, as used in positioning the guide edge for a first groove cut, in a sequence of corner joint cuts as made in fabricating a duct section from one continuous piece of duct board, as will be further shown in the following figures. The housing 201 of a spring-return type measuring tape 65 is fixedly mounted on a flanged plate 69, in a manner allowing the assembly to be carried on the blade 34 of T-square 35 by hooking the flange 73 over the left edge of the blade 34. The gauge is shown with its appendage 77 hooked over the right hand edge 29 of the fiber glass board 25 placed so that the aluminum foil 205 to which the fiber glass is bonded, is on the lower side. The guide edge 33 is moved to the left until it coincides with the "O" inch mark on the tape, positioning the guide edge for the first groove cut and so that the space between the right hand edge of the groove and the right hand edge of the board will be as required to later form a stapling flap. The gauge 61 is lifted and brought toward the guide edge 33, allowing the tape 65 to be retrieved into the housing 201, the gauge and tape then being allowed to fall to the left of the T-square so as to clear the guide edge, and the grooving tool 38 is moved across the board 25, and in contact therewith.

FIG. 12 shows the gauge in operation, as used in positioning the guide-edge for a second groove cut, with the trailing face of the appendage 77 held against the butt edge face of the prior groove cut. The guide-edge 33 is moved to the left until the desired inside dimension of that side of the duct, as indicated by the tape (e.g. 4 inches) coincides with the guide edge. The gauge 61 is lifted, the tape automatically retrieved, and the assembly dropped to the left of the T-square, the ends of the grooving tool reversed, as compared to the prior cut, and the second groove cut is made. The groove cut, so executed, will measure 4 inches (see FIG. 13), between two upper corners of the two rabbeted edges of this side of the duct.

FIG. 13 shows the gauge in operation, as used in positioning the guide-edge for a third groove cut with the leading face of the appendage 77 hooked over the butt edge face of the prior groove cut 31, and the guide-edge moved to the left into position for a third groove cut, the ends of the grooving tool reversed, as compared to the prior cut, and the cut made which in this case, is for a side with an inside dimension of 3 inches; however, in the stretch-out position, this side will actually measure 4 inches edge to edge, allowing ½ inches at each edge to fit into the ½ inches deep rabbeted edges of the adjacent sides.

A third side, or a fourth groove cut, is dimensioned, laid off and cut similarly to the first side, or second groove cut (FIG. 11).

FIG. 14 shows the gauge in operation, as used to position the guide-edge for a fifth cut which will be a knife cut, vertically through the board and facing. The appendage 81, is hooked over the butt edge side of the last groove cut, the T-square moved to the left the inside dimension of this side (e.g. 3 inches), as indicated on the tape coincides with the guide-edge, and at this point the knife cut is made.

Lastly, a knife cut is made along the beginning edge of this sequence of cuts, the blade of the knife being held parallel to and just above the facing, separating, therefrom, the fiber glass lying between the beginning edge and the first groove cut, to leave the stapling flap 51 (FIG. 1).

It is interesting to note that while the gauge has only a few predetermined measurements and configurations or defining arms or appendages, nevertheless the duct may be cut and formed to any size desired, including a zero opening.

Also, as has no doubt been noted, the "O" inch point on the tape is offset from the gauge 75. This is to allow maximum movement of the gauge relative to the tape to avoid damage.

While the gauge body 61 is shown, in FIG. 3, connected to a measuring tape, it will be appreciated that this gauge may be connected to a measuring bar as is the gauge body 91, shown in FIG. 4, a combination yielding certain advantages in the lay-out and cutting of duct fittings the worker using the bar for both measuring and as a guide-edge, the bar being, say 36 to 45 inches long, marked off in inches on all four sides, and attached to the gauge by means of a tenon plug 103 or similar means. The outward configuration of the gauges shown in FIG. 4 and in FIG. 3 are identical except with regard to the appendages 95 and 77, respectively. It will be recalled that, in the foregoing specification, it was stated that the appendage 77 was used by hooking its leading face over a butt edge side of a groove (when that butt edge side was on the left hand side of the groove) and by holding its trailing face against the butt edge side of a groove (when that butt edge side was the right hand side of the groove). Obviously, as this could lead to errors in lay-out, however, the dimension from the center-of-the-corner-joint, of the groove, to the tool edge, as cut by the grooving tool, as currently manufactured, is such that an appendage with the dimension, from the leading face to the trailing face, such as the appendage 77, of FIG. 3, is necessary. In order to avoid this probability of error, the appendage 95, FIG. 4, was designed to fit into the lower portion of the groove, to fill the space between the butt edge face and the nearer vertical face of the rabbeted edge, as a consistent placement of the appendage, within a groove, and when gauging from a beginning edge, —butt edge—, the appendage would be hooked over the edge, as formerly.

To effect this change, appendage 95, FIG. 4, versus appendage 77, FIG. 3, it will be necessary to also modifiy the grooving tool. FIG. 15 is an end view of the grooving tool showing the relative lateral positions of the cutter blades and the tool edges. The tool edges 201 and 202, shown in solid outline, represent the tool as currently manufactured, and the tool edges 203 and 204, shown in dotted outline, represent the modification necessary to the above.

What is claimed is:

1. A gauging means including a linear measurer for use in a dimensioning procedure to set the position of a guide-edge for cutting tools prior to making single vertical cuts, and modified ship-lap groove cuts containing a rabbeted edge along one side and a vertical butt edge along the other side, in insulating board of appreciable thickness, in order that a corner may be formed therealong for the subsequent fabrication of structures specified as to inside dimensions including ducts, duct fittings, conduits, and box-like structures; said gauging means comprising a multi-sided body, and linear measurer, and rotatable means of attachment, one to the other to permit rotation of the body relative to the measurer, a plurality of appendages extending from the body and each having at least one alignment face to engage edges of, or cuts in, the board; at least one of said appendages having both a leading and a trailing face with a third means of alignment centered therebetween; said one appendage extending outwardly of said body for a distance no greater than the rabbet depth of said rabbeted edge; said one appendage having a length longitudinally of the body equal to twice the distance between the vertical face and the adjacent rabbeted edge of the modified ship-lap groove; either of said leading and trailing gauging faces, when adjacent the vertical butt edge of a groove cut, sets the position of the body and the attached linear measurer in that longitudinal location along a line of measurement which will allow the linear measurer to indicate the position of the guide-edge for the subsequent groove cut in terms of the specified inside dimension of that side of the structure lying between the aforesaid groove cut and the aforesaid subsequent groove cut whether or not the butt edge face of the aforesaid groove cut faces in a direction toward, or oppositely from, the aforesaid subsequent groove cut.

2. The gauging means of claim 1 wherein said third alignment means sets the location of the gauging means when measuring from a beginning edge of the insulating board in that position along the line of measurement so that the linear measurer will indicate the position of the guide-edge for a first groove cut in terms of the required inside dimension, after fabrication, of that side of the structure being layed off between the corners formed at the said beginning edge and at the said first groove.

3. A gauging means comprising a body, linear measurer, and means of attachment, one to the other, for positioning a guide-edge used to guide a knife in making single vertical cuts, or a tool to cut grooves in insulating board of appreciable thickness, said grooves comprising a rabbeted edge along one side thereof and a vertical butt edge along the other side thereof to form the corner joints of ducts, duct fittings, conduits, and box-like structures to specified inside dimensions, a plurality of appendages extending from the body to engage edges of, or cuts in, the board, one of said appendages having three alignment means comprising two opposing faces and a third means between the two faces, each at a different point longitudinally along the body by means of which the gauging means can be located at that position relative to a beginning knife cut to become a rabbeted edge, or from a groove and along a line of measurement which provides location of the guide-edge by the linear measurer in terms of the specified inside dimension of the side of the structure defined by the subsequent groove cut, whether its rabbeted edge, or the rabbeted edge of the immediately prior groove, are both leading, both trailing, or individually opposite, with respect to the direction of the measurement by locating the third means over the knife cut for a first groove cut, locating one opposing face adjacent to the vertical butt edge of said first groove for a second groove cut, and locating the other opposing face adjacent to the vertical butt edge for a third groove cut.

4. The gauge means of claim 3 wherein said body, through its means of attachment to the linear measurer, comprises a multi-faced extension thereof and said appendages extending from certain of its faces.

5. The gauge means of claim 3 wherein the attachment means provides rotational positioning of the body means around the approximate longitudinal centerline of the linear measurer.

6. The gauge means of claim 5 wherein the attachment means further comprises means providing longitudinal adjustment of the body means with respect to that of the linear measurer.

7. The gauge means of claim 3 wherein the linear measurer comprises means for transport by the straightedge used to guide the cutting tools.

8. The gauging means for claim 3 comprising a body, a combination linear measuring means and straightedge, and means of rigid connection one to the other.

9. A gauging means for use in setting the position of a guide-edge, for groove or single straight blade cutting tools, at certain definite positions, from an edge of, from immediately prior grooves in, or from cuts made in, insulating board of appreciable thickness in the fabrication of structures specified as to inside dimensions including ducts, duct fittings, and other box-like structures wherein said grooves are modified ship-lap grooves and are cut having a continuous vertical face along one side and a rabbeted edge along the other, said grooves making possible the fabrication of structures having modified ship-lap corner joints and wherein said grooves have reversed cross-sections for at least a pair of adjacent grooves, said gauging means comprising a multi-sided gauge body, a linear measurer, and means for rotatably attaching one to the other, a plurality of appendages extending from the gauge body to engage edges, groove surfaces, or cuts in the board; at least one of said appendages having three alignment means for use when measuring from a groove, or from a beginning edge of the board, to set the guide-edge for a subsequent groove cut, said alignment means comprising two gauging faces and a third means centered therebetween, with said gauging faces normal to the line of measurement and spaced apart the distance which, when either of the gauging faces is positioned against a vertical face of a groove cut, positions said third means at the center between those points along the surface of the insulating board which will coincide along the juncture of the two adjacent sides of the structure when a corner is subsequently formed along said groove, said gauging means locating in terms of said specified inside dimensions of the structure, the positions of the guide-edge to make allowances for the materials cut from the board to form the modified ship-lap corner joints.

10. A modified ship-lap gauging means for locating a guide-edge, for use in guiding cutting tools for making grooves and single vertical cuts, at selectable locations from immediately prior grooves or cuts made in insulating board of significant thickness in the fabrication of structures specified as to inside dimensions including ducts, duct fittings, and other box-like structures wherein the corners are modified ship-lap joints formed from grooves having a vertical butt edge along one side and a rabbeted edge along the other side, said gauging means comprising a multi-sided gauge body; a linear measurer; means for attaching one to the other; and a plurality of appendages extending from the gauge body to engage edges or cuts of the board; at least one of said appendages having at least a midpoint thereof located at a position on the body a distance measured from a zero reference on the linear measurer substantially equal to one-half the width of the groove cutting tool plus one-and-three-quarters times the thickness of the board; whereby said gauging means locates, in terms of said specified inside dimensions of the structure, the position of said guide-edge for successive cuts by locating said midpoint directly above the intersection of the rabbeted edge adjacent the butt edge and the lower surface of the board which intersection is the outside corner of the box-like structure which intersection coincides with the diagonal center line of the corner structure whether or not the butt edge face of the groove is leading or trailing.

11. The gauging means of claim 10 wherein the one appendage has a width equal to twice the width of the lower portion of the modified ship-lap groove to provide two surfaces for contact with similar walls of successive grooves in locating said guide edge.

12. The gauging means of claim 10 wherein the one appendage has a depth no greater than the depth of the rabbet along the rabbeted edge of the groove.

13. A modified ship-lap gauging means for use in spacing a guide-edge for groove or single straight blade cutting tools at selectable positions from an edge of, from immediately prior grooves, or from cuts made in insulating board of appreciable thickness in the fabrication of structures specified as to inside dimensions including ducts, duct fittings, and other box-like structures wherein the corners are modified ship-lap joints and the modified ship-lap grooves have reversed cross-sections for at least a pair of adjacent grooves, said gauging means comprising a multi-sided gauge body, a linear measurer, and means for attaching one to the other, a plurality of appendages extending from the gauge body to engage edges, groove surfaces, or cuts in the board; at least one of said appendages having two alignment faces, each facing oppositely and longitudinally of the gauge, and a third alignment means centered therebetween, so that by setting either of the aforesaid faces in contact with like faces of grooves sets said third alignment means to coincide with a vertical plane which extends through and parallel to the groove to intersect the lower surface of the board at that location which, after fabrication of the corner joint, will coincide with the diagonal center line thereof to set the gauge in a single position relative to the diagonal center line through the corner joint subsequently formed, and irrespective of the reversing cross-sections of adjacent grooves, whereby said gauging means locates in terms of said specified inside dimensions of the structure, the positions of said guide-edge to make allowances for material cut from the board to form the modified ship-lap corner joints.

* * * * *